(12) United States Patent
Chang

(10) Patent No.: US 7,676,297 B2
(45) Date of Patent: Mar. 9, 2010

(54) SPRING-FORMING CONTROL SYSTEM AND ITS CONTROL METHOD FOR A SPRING FORMING MACHINE

(75) Inventor: Chih-Fu Chang, Kaohsiung (TW)

(73) Assignee: Tzyh Ru Shyng Automation Co., Ltd., Kaohsiung (TW)

( * ) Notice: Subject to any disclaimer, the term of this patent is extended or adjusted under 35 U.S.C. 154(b) by 107 days.

(21) Appl. No.: 11/899,821

(22) Filed: Sep. 7, 2007

(65) Prior Publication Data

US 2008/0270927 A1 Oct. 30, 2008

(51) Int. Cl.
- G06F 19/00 (2006.01)
- B23P 13/00 (2006.01)
- B21F 3/02 (2006.01)
- B21F 3/10 (2006.01)
- B21C 47/00 (2006.01)

(52) U.S. Cl. .................. 700/165; 700/97; 700/98; 700/118; 700/163; 29/896.8; 29/896.9; 72/135; 72/138; 72/146

(58) Field of Classification Search ............. 700/97–98, 700/118, 163, 165; 29/896.8, 896.9; 72/135, 72/138, 146; 148/508, 908
See application file for complete search history.

(56) References Cited

U.S. PATENT DOCUMENTS

| | | | | |
|---|---|---|---|---|
| 4,672,549 A | * | 6/1987 | Saxton | 700/145 |
| 4,934,165 A | * | 6/1990 | Philpot et al. | 72/18.9 |
| 5,875,664 A | * | 3/1999 | Scott et al. | 72/16.1 |
| 6,151,942 A | * | 11/2000 | Itaya | 72/137 |
| 6,648,996 B2 | * | 11/2003 | Hasegawa | 148/580 |
| 6,669,128 B2 | * | 12/2003 | Appleby et al. | 242/362.2 |
| 6,758,079 B2 | * | 7/2004 | Wells et al. | 72/138 |
| 6,836,964 B2 | * | 1/2005 | Hasegawa et al. | 29/896.9 |
| 2003/0158620 A1 | * | 8/2003 | Hasegawa et al. | 700/165 |
| 2008/0302156 A1 | * | 12/2008 | Itaya | 72/135 |

* cited by examiner

*Primary Examiner*—Ramesh B Patel
(74) *Attorney, Agent, or Firm*—Pro-Techtor Int'l Services; Ralph Willgohs

(57) ABSTRACT

A spring-forming control system and its control method for a spring forming machine in which the spring-forming control system uses a host computer to provide graphical spring parameter setting, program modification, and dragline-method program modification graphical interfaces that are selectively switchable on a display monitor. After setting of spring processing parameters through the spring parameter setting interface, a trial production is done subject to a spring parameter auto-generation software built in the spring-forming control system, and then the production is started if the trial meets the requirements, or the spring processing parameters are modified through the spring parameter setting interface, program modification interface, or dragline-method program modification interface if the trial does not meet the requirements, and then a further trial production is performed till the shaped spring meets the requirements. A spring preview is available during running of the spring-forming control system. The graphic interface operation has the advantages of convenience, rapidness, and accuracy.

11 Claims, 11 Drawing Sheets

```
%
N001 G1 A0. X17.5 Y0. Z55.672 F20000
N002 X18.375 Y1.661 Z23.207
N003 X18.375 Y1.661 Z23.207
N004 Y3.323 Z23.241
N005 Y4.984 Z23.298
N006 Y6.646 Z23.376
N007 Z761.216 F35000
N008 Y4.984 Z23.376 F20000
N009 Y3.323 Z23.298
N010 Y1.661 Z23.241
N011 X17.5 Y0. Z23.207
N012 A0. Z111.344
N013 G28 Y0.
N014 A180. F45000
N015 A360. F22500
N016 M30
%

EDIT - MODE  0  0 Total max : 50
```

| NO | G | ⌀ | ⬚ | ⊕ | O | ◎ | ↓ | ↵ | ✱ |
|---|---|---|---|---|---|---|---|---|---|
| 1 | | | | | | | | | |
| 2 | | 32.000 | 0.000 | 41.605 | 0.500 | 0.500 | 0.000 | | 360000 |
| 3 | | 36.697 | 3.350 | 48.863 | 0.250 | 0.750 | | | 100000 |
| 4 | | 41.688 | 6.700 | 57.251 | 0.250 | 1.000 | | | |
| 5 | | 46.579 | 10.050 | 66.376 | 0.250 | 1.250 | | | 100000 |
| 6 | | 53.872 | 13.400 | 76.241 | 0.250 | 1.500 | | | |
| 7 | | 59.009 | 13.400 | 85.859 | 1.000 | 2.500 | | | |
| 8 | | 65.615 | 13.400 | 93.751 | 1.000 | 3.500 | | | |
| 9 | | 70.400 | 13.400 | 101.397 | 1.000 | 4.500 | | | |
| 10 | | 72.800 | 10.050 | 107.069 | 0.250 | 4.750 | | | |
| 11 | | 75.200 | 6.700 | 113.003 | 0.250 | 5.000 | | | |
| 12 | | 77.600 | 3.350 | 116.621 | 0.250 | 5.250 | | | |
| 13 | | 80.000 | 0.000 | 120.387 | 0.250 | 5.500 | | | |
| 14 | | 80.000 | 0.000 | 116.965 | 0.500 | 6.000 | | | 100000 |

SPRING-FORMING CONTROL SYSTEM AND ITS CONTROL METHOD FOR A SPRING FORMING MACHINE

BACKGROUND OF THE INVENTION

1. Field of the Invention

The present invention relates to a spring forming machine and more particularly, to a spring-forming control system and its control method for a spring forming machine, which provides graphic interfaces for easy and rapid operation control.

2. Description of the Related Art

Conventional spring forming systems commonly have a spring-forming control system 100 (as shown in FIG. 1) for setting spring processing parameters (such as size, and etc.) and controlling the spring forming processing operation of the machine. A spring-forming control system 100 for such a spring forming machine is known comprising a control panel 10 and a host (not shown). The control panel 10 has installed therein the display panel 20 and operation buttons 30 of the host.

When the machine is started, it enters a manual mode for the setting of the standard specifications of the machine base (such as multiplication, count, wire rack, . . . etc.) and the outer diameter of spring start end. When entered in the manual mode, the user sets the spring processing parameters (such as size), and the fabrication of spring can then be started. According to this spring-forming control system 100 (see FIG. 1), the operator must rotate the operation button 30a to JOG position (see FIG. 1A) after entered the manual mode and before adjusting the related specifications (such as multiplication, count, wire rack, . . . etc.) and setting the spring processing parameters, thereafter the operator must rotate the operation button 30a to MCM position (see FIG. 1A), and then rotate the other operation buttons 30b to respective setting positions for the setting of respective parameters (such as spring form, one cut, roller, arbor seat, . . . etc.), and then start the fabrication.

Further, if the spring thus made is not in conformity with the desired specifications, the user must correct the program 40 displayed on the display panel 20 (see FIG. 2), i.e., turn the operation buttons 30b to the respective parameter setting positions for correction of respective parameters (such as spring form, one cut, roller, arbor seat, . . . etc.). This procedure is complicated. Only a skilled person can correct the program 40 on the display panel 20. After correction, a trial is necessary. If the result is still not in conformity with the requirements, correction must be repeated until the result fits the requirements. Therefore, this prior art interference design is complicated and not with a humanized approach. Many data must be inputted or corrected individually subject to the parameter cable. To a beginner, it is difficult to learn and operate a spring-forming control system without graphicalized software, resulting in low working efficiency.

SUMMARY OF THE INVENTION

The present invention has been accomplished under the circumstances in view. It is the main object of the present invention to provide a spring-forming control system and its control method for a spring forming machine, which provides graphical user interfaces (GUIs) for easy and rapid operation control. The human-factor engineering characteristic of the present invention greatly improves the working efficiency and reduces the error rate.

According to one aspect of the present invention the spring-forming control method is used with a spring-forming control system in a spring forming machine for making springs. The spring-forming control system provides a spring parameter setting interface, a program modification interface, and a program modification interface, which in one embodiment has a dragline (,i.e. "drag-and-drop") method, switchable on a display monitor of a host computer that controls the operation of the spring forming machine. The spring-forming control method comprises the steps of: (1). setting spring processing parameters using said spring parameter setting interface; (2). trying to make a spring subject to a spring parameter auto-generation software built in said spring-forming control system; and (3). starting the production if the trial meets the requirements otherwise entering one of said spring parameter setting interface and said program modification interface and said dragline-method program modification interface to modify the spring processing parameters or the program if the trial does not meet the requirements, and then making a secondary spring trial production, and, if necessary, repeating the procedure again and again till the shaped spring meets the requirements.

According to another aspect of the present invention, the spring-forming control system further provides a spring preview graphic interface for allowing preview of the pattern of the spring to be made before the production in trail. The spring parameter setting interface provides a spring plane figure and a plurality of spring parameter input Boxes for the user to input data subject to requirements. The program modification interface is shown on the display monitor of the host computer as a list display to show spring parameters including OD, Pitch, Feed, Upper Cutter, Lower Cutter, and Number of Coils (Turns). Further, the dragline-method program modification interface provides an OD (outer diameter) axis selection interface, a pitch axis selection interface, and a feed axis selection interface. These selection interfaces each provide a shift-adjustment frame for adjustment using dragline, and a corresponding spring parameter list. When making an adjustment using dragline or when modifying the shift-adjustment frame, the spring parameter list is accordingly changed. When correcting the spring parameter list, the content of the shift-adjustment frame is accordingly changed. Further, the spring preview graphic interface provides a corresponding spring parameter list, and the figure of the spring is accordingly changed when correcting the parameters listed in the corresponding spring parameter list.

According to still another aspect of the present invention, the spring-forming control system comprises a host computer for controlling the operation of the spring forming machine, a display monitor which in one embodiment is a GUI display, electrically connected to the host computer for data display, and instruction input interface electrically connected to said host computer for data input. The host computer comprises a built-in spring parameter auto-generating software. The spring forming machine is controlled to make springs subject to the spring parameter auto-generating software. The host computer provides a spring parameter setting interface, a program modification interface, and a dragline-method program modification interface selectively switchable on the display monitor. The spring parameter setting interface provides a spring plane figure and a plurality of spring parameter input Boxes, and is adapted for setting spring processing parameters. The program modification interface is to list spring parameters. The dragline-method program modification interface provides multiple spring parameter selection interfaces. Each spring parameter selection interface provides a shift-adjustment frame for adjustment of spring parameters by dragline, and a corresponding spring parameter list. The host computer further provides on the display monitor a spring preview graphic interface. The program modification interface lists spring parameters including OD, Pitch, Feed, Upper Cutter Lower Cutter, and Number of Coils (Turns). The dragline-method program modification interface provides an OD (outer diameter) selection interface, a pitch selection interface, and a feed selection interface. These selection interfaces each provide a shift-adjustment frame for adjustment by dragline, and a corresponding spring parameter list. When making an adjustment by dragline or when modifying the shift-adjustment frame, the spring parameter list is accordingly changed. When correcting the spring parameter list, the content of the shift-adjustment frame is accordingly changed. Further, the spring preview graphic interface provides a corresponding spring parameter list, and the figure of the spring is accordingly changed when correcting the parameters listed in the corresponding spring parameter list.

BRIEF DESCRIPTION OF THE DRAWINGS

FIG. 2 is a schematic drawing showing the program picture frame of the spring forming machine according to the prior art.

FIG. 7 is a schematic drawing of Program Modification Interface of the spring-forming control system according to the present invention.

DETAILED DESCRIPTION OF THE PREFERRED EMBODIMENT

Figure 1:
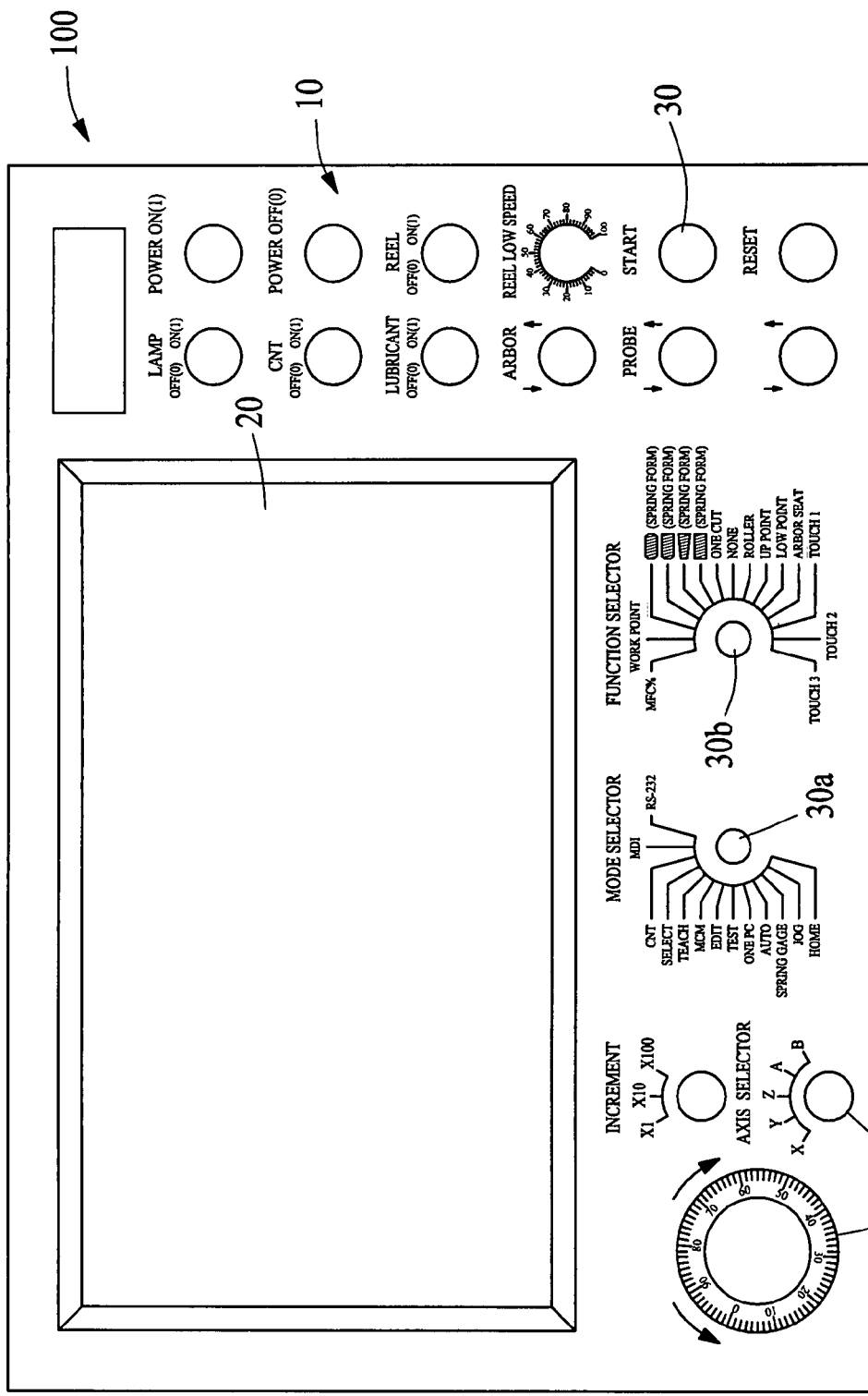
FIG. 1 is a schematic drawing showing the control panel of a spring forming machine according to the prior art.
Figure 1A:
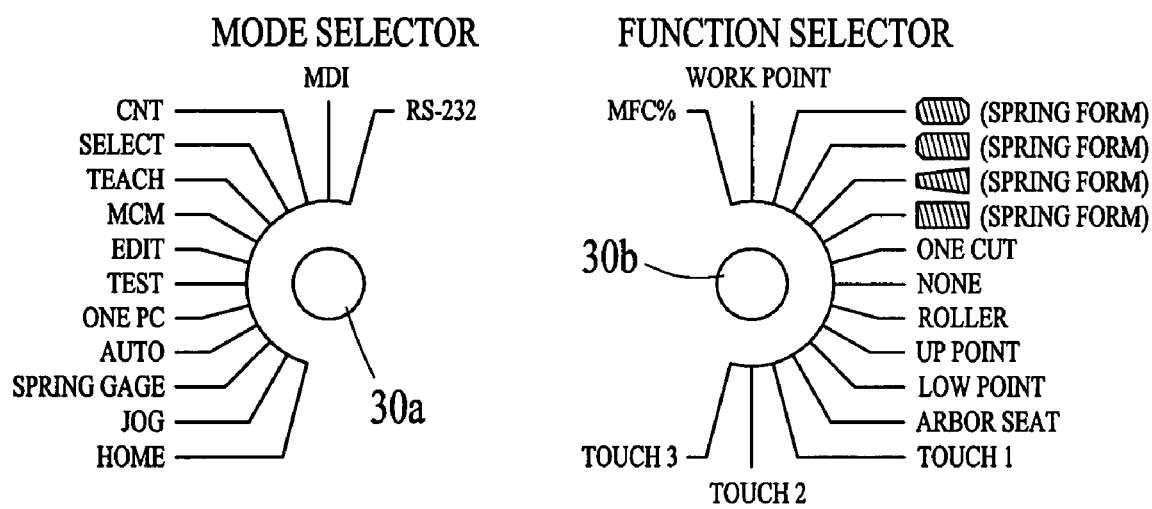
FIG. 1A is an enlarged view of a part of FIG. 1, showing the function selections of the system.
Figure 3:
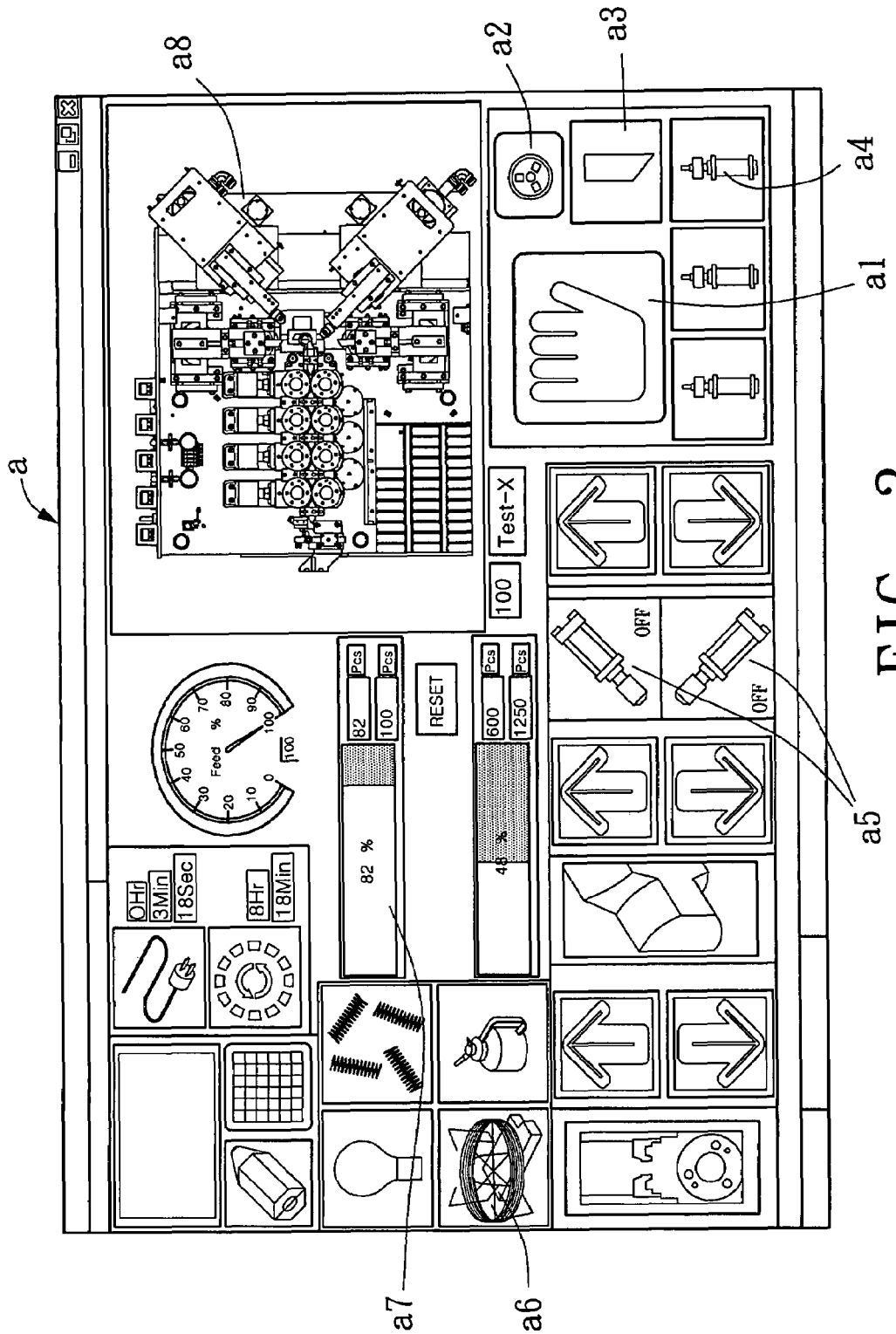
FIG. 3 is a schematic drawing showing the main menu of the spring-forming control system according to the present invention.
Figure 4:
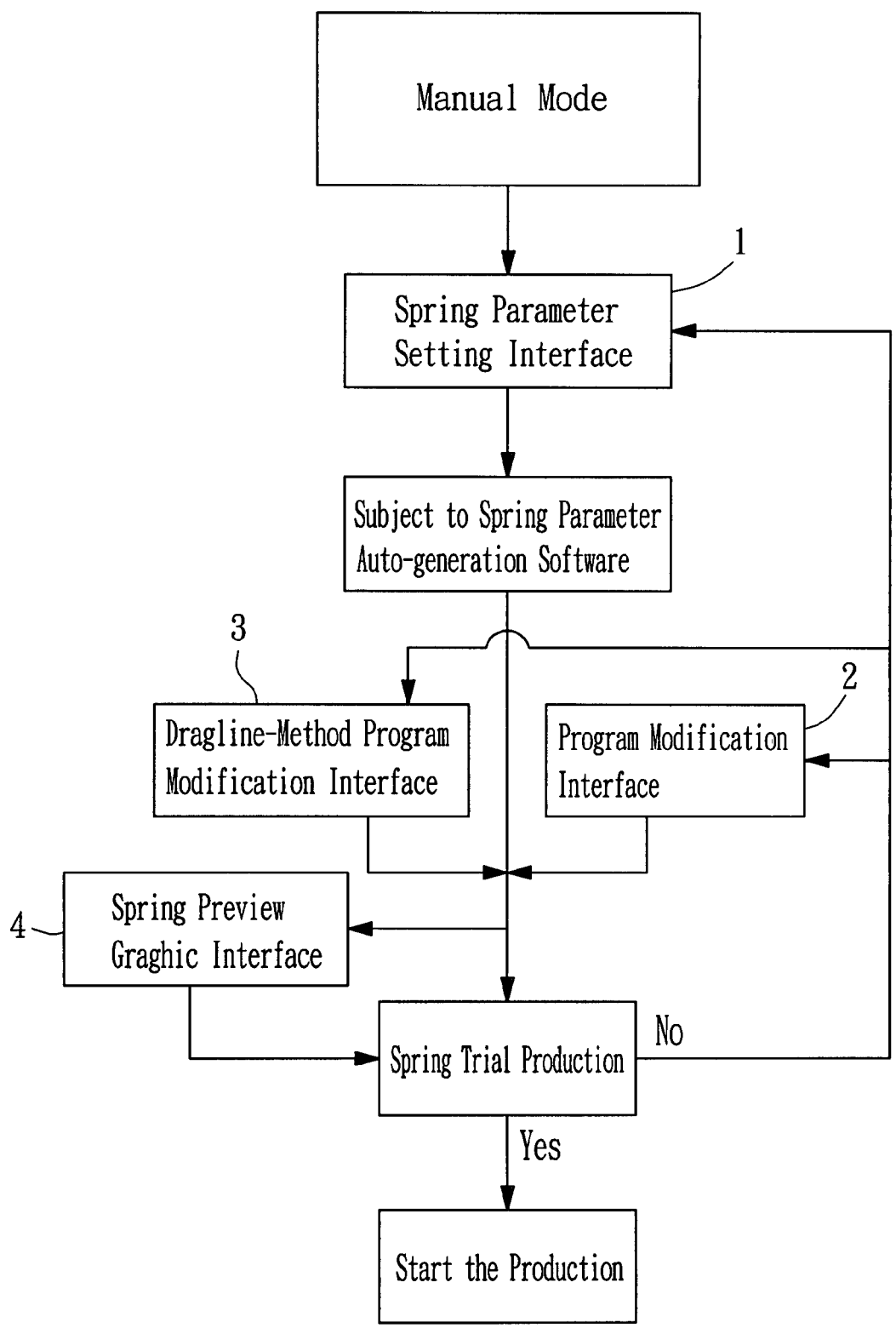
FIG. 4 is a flow chart of the spring-forming control method according to the present invention.

The invention provides a spring-forming control system for use in a spring forming machine to make springs subject to a predetermined spring-forming method. The host computer of the spring-forming control system shows all data on a display monitor (a) by a diagram interface of graphic interface (see FIG. 3). What is displayed on FIG. 3 is the main menu. The main menu shows simulation menus of Manual Mode (a1), Feed (a2), Cutter Setting (a3), Carbon Needle (a4), Upper/Lower Cylinder (a5), Material Rack (a6), Quantity Diagram (a7), and Machine Tools (a8). During operation enters setting through the Manual Mode (a1), and then enter parameter setting. The spring-forming control system allows selectively switching screens on the display monitor (a) of the host computer to show the Main Menu (see FIG. 3), or one of: the Spring Parameter Setting Interface (1) (see FIG. 5) the Program Modification Interface (2) (see FIG. 7). the Dragline- Method Program Modification Interface (3) (see FIGS. 8-10) the Spring Preview Graphic Interface(4) (see FIG. 4-6).

The spring-forming control method of the present invention comprises the steps of (see FIG.4):

1. Set spring processing parameters by the Spring Parameter Setting Interface (1), wherein Spring Parameter Setting Interface (1) comprises a Spring plane FIG. (11), and a plurality of Spring Parameter Input Boxes (12) (see FIG. 5) for the user to input data subject to requirements;

2. Try to make a spring subject to the spring parameter auto-generation software built in the spring-forming control system;

3. Start the production if the trial meets the requirements; enter Spring Parameter Setting Interface (1) of the spring-forming control system to modify the spring processing parameters, or Program Modification Interface (2) of the spring-forming control system to modify the program, or Dragline-Method Program Modification Interface (3) of the spring-forming control system to modify the program if the trial does not meet the requirements, and then make a secondary spring trial production, and, if necessary, repeat the procedure again and again till the shaped spring meets the requirements.

Figure 6:
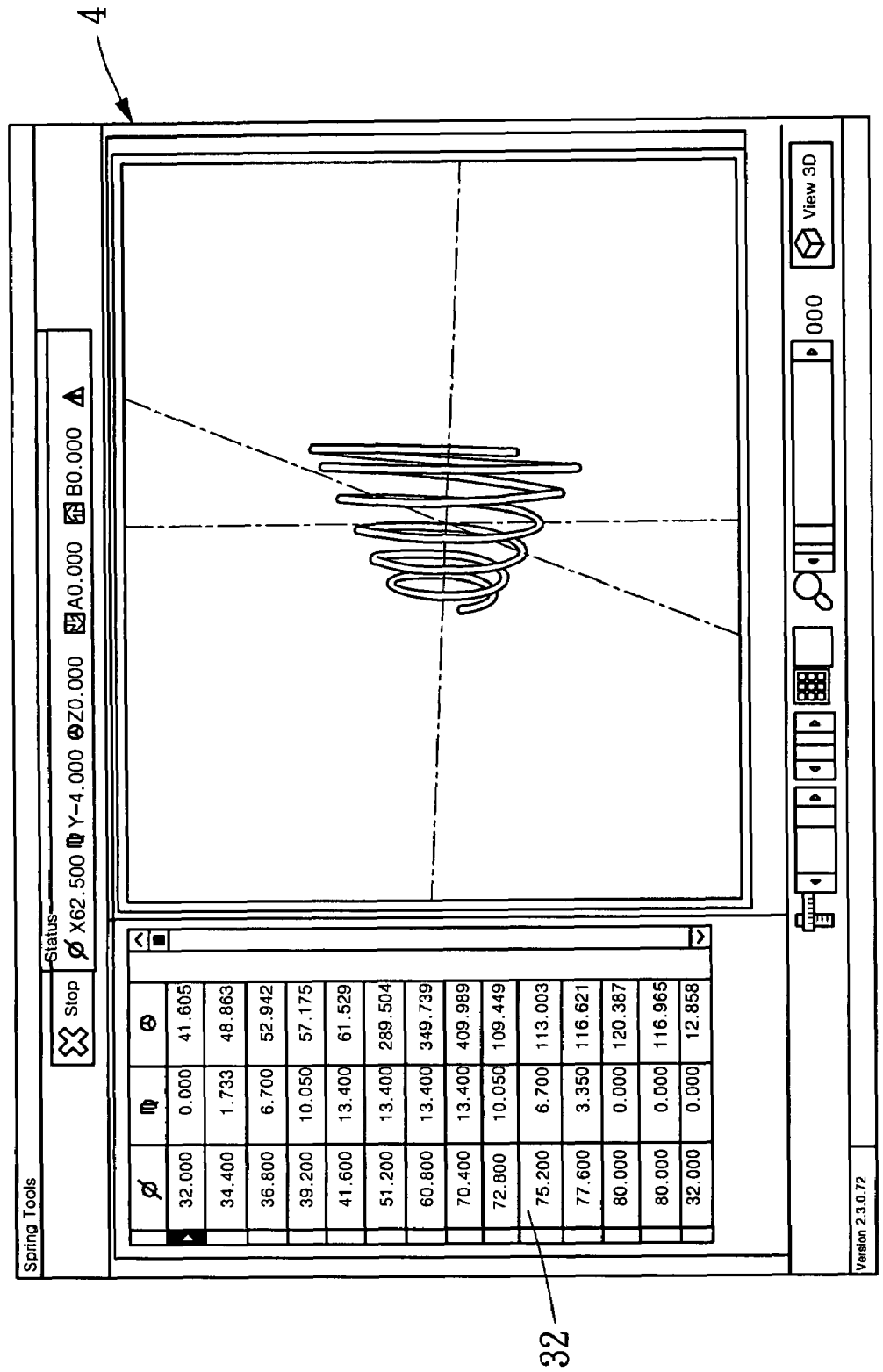
FIG. 6 is a schematic drawing of Spring Preview Graphic Interface of the spring-forming control system according to the present invention.

Further, before the production begins, the operator can enter Spring Preview Graphic Interface (4) of the spring-forming control system to preview the spring pattern (see FIG. 6).

Further, Program Modification Interface (2) is shown by a list display (see FIG. 7), and the listed spring parameters include OD (21), Pitch (22), Feed (23), Upper Cutter (24), Lower Cutter Axis (25), and Number of Coils (Turns) (26) for the operator to modify the listed parameters directly.

Figure 8:
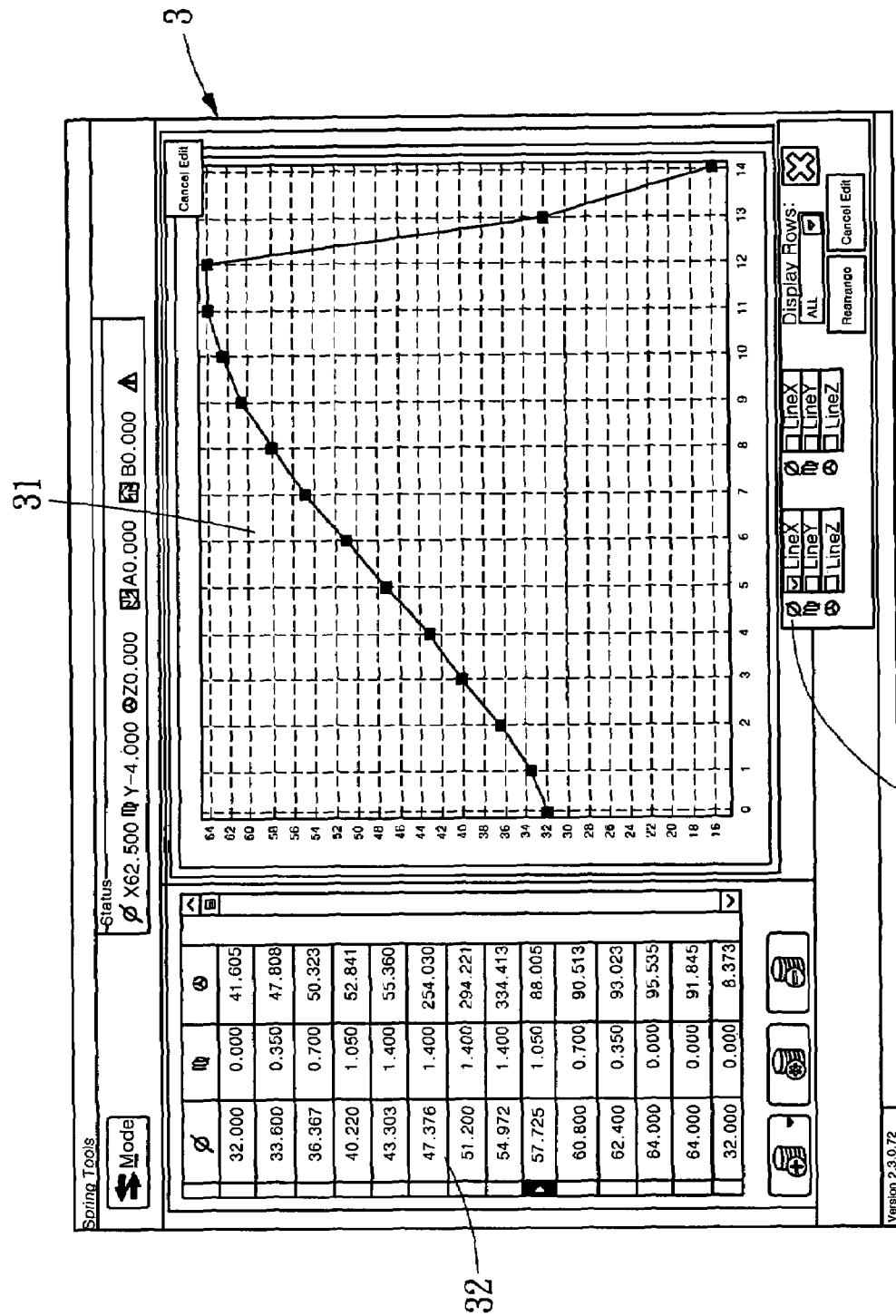
FIG. 8 is a schematic drawing of the OD Axis Interface (Line X) of Dragline-Method Program Modification Interface of the spring-forming control system according to the present invention.
Figure 9:
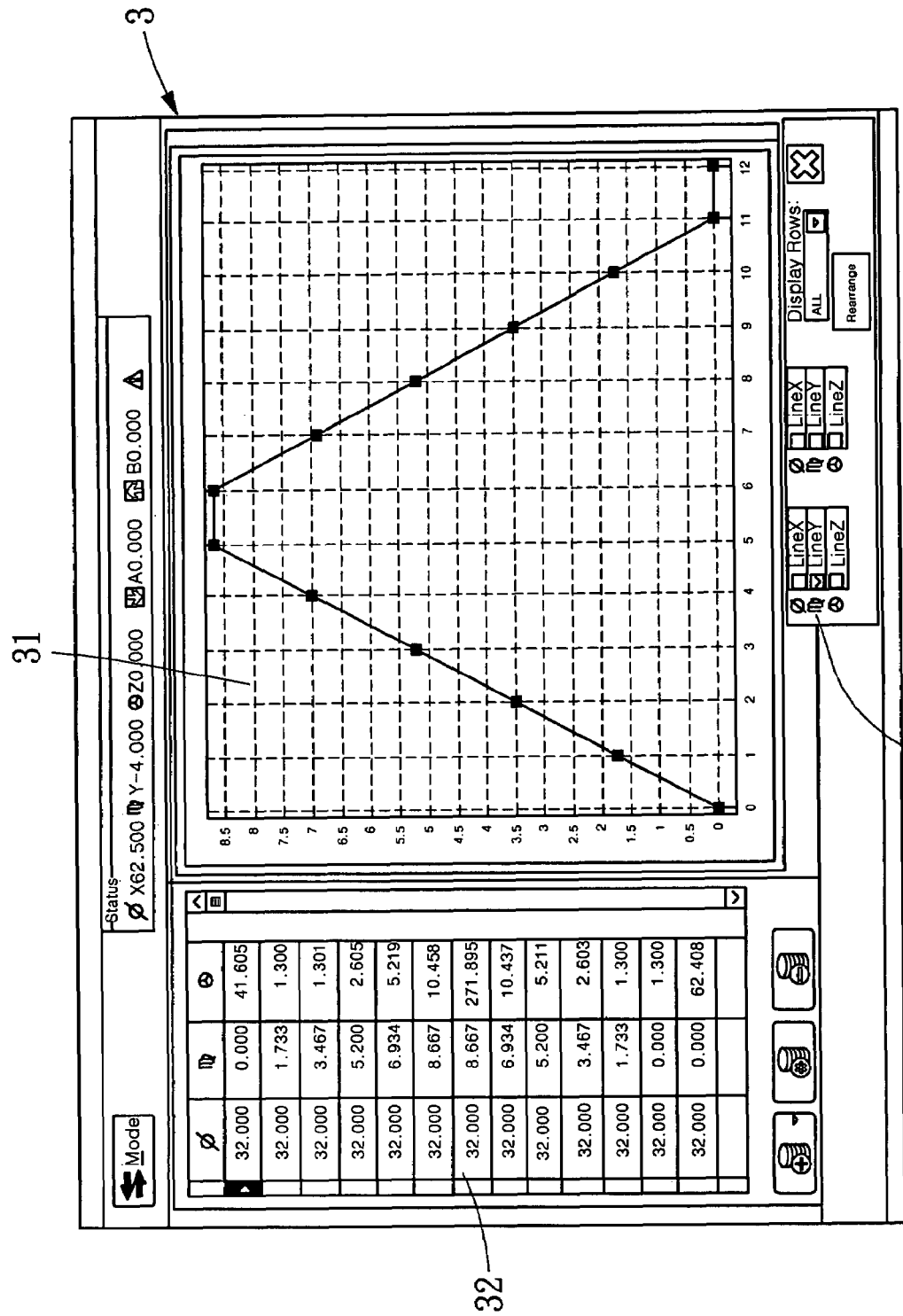
FIG. 9 is a schematic drawing of the Pitch Axis Interface (Line Y) of Dragline-Method Program Modification Interface of the spring-forming control system according to the present invention.
Figure 10:
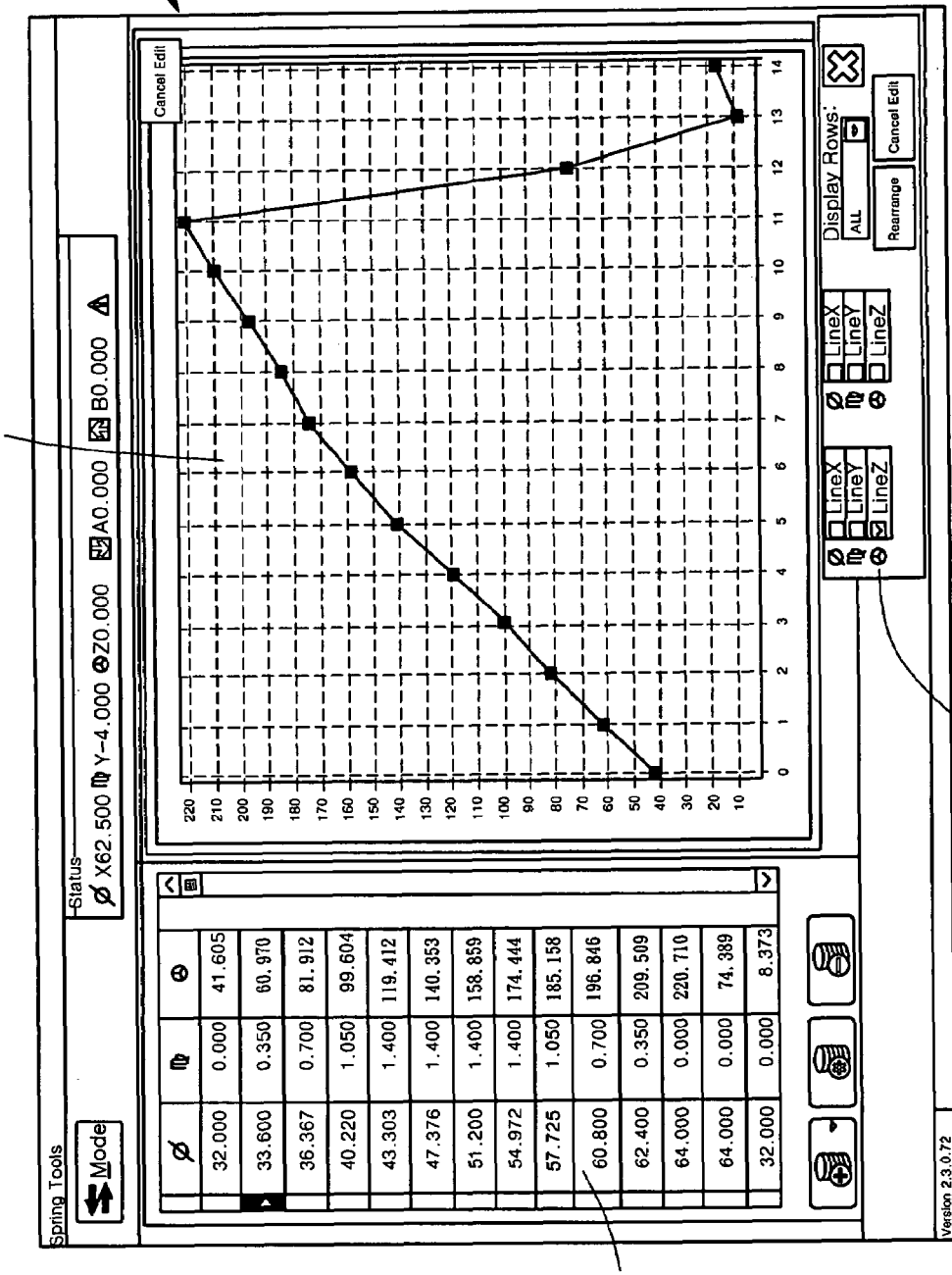
FIG. 10 is a schematic drawing of the Feed Axis (Line Z) Interface of Dragline-Method Program Modification Interface of the spring-forming control system according to the present invention.

Dragline-Method Program Modification Interface (3) of the spring-forming control system provides selection interfaces for the spring parameters of OD (21) (Line X), Pitch (22) (Line Y), and Feed (23) (Line Z) (see FIGS. 8, 9, and 10 respectively). Each selection interface provides a shift-adjustment frame (31) for adjustment by dragline, and a spring parameter list (32). When making an adjustment by dragline or when modifying the shift-adjustment frame (31) (when dragging the mouse after pressed the scroll-control wheel of the mouse at the point to be modified), the spring parameter list (32) is accordingly changed. When the shift-adjustment frame (31) is adjusted to a predetermined graphic, the spring parameter list (32) shows the corresponding spring parameter. On the contrary, when correct the spring parameter list (32) directly, the content of the shift-adjustment frame (31) is accordingly changed. Thus, fine adjustment can be done. Further, as shown in FIG. 6, Spring Preview Graphic Interface (4) also shows the corresponding spring parameter list (32). When correct the parameters listed in the spring parameter list (32), the figure of the spring is accordingly changed.

As stated above, the spring-forming control system comprises a host computer (not shown). The host computer comprises a GUI display monitor (a), and an instruction input device (such as mouse, keyboard, etc.; not shown). The host computer has built therein spring parameter auto-generation software for enabling the spring forming machine to make springs subject to the spring parameter auto-generation software.

Figure 5:
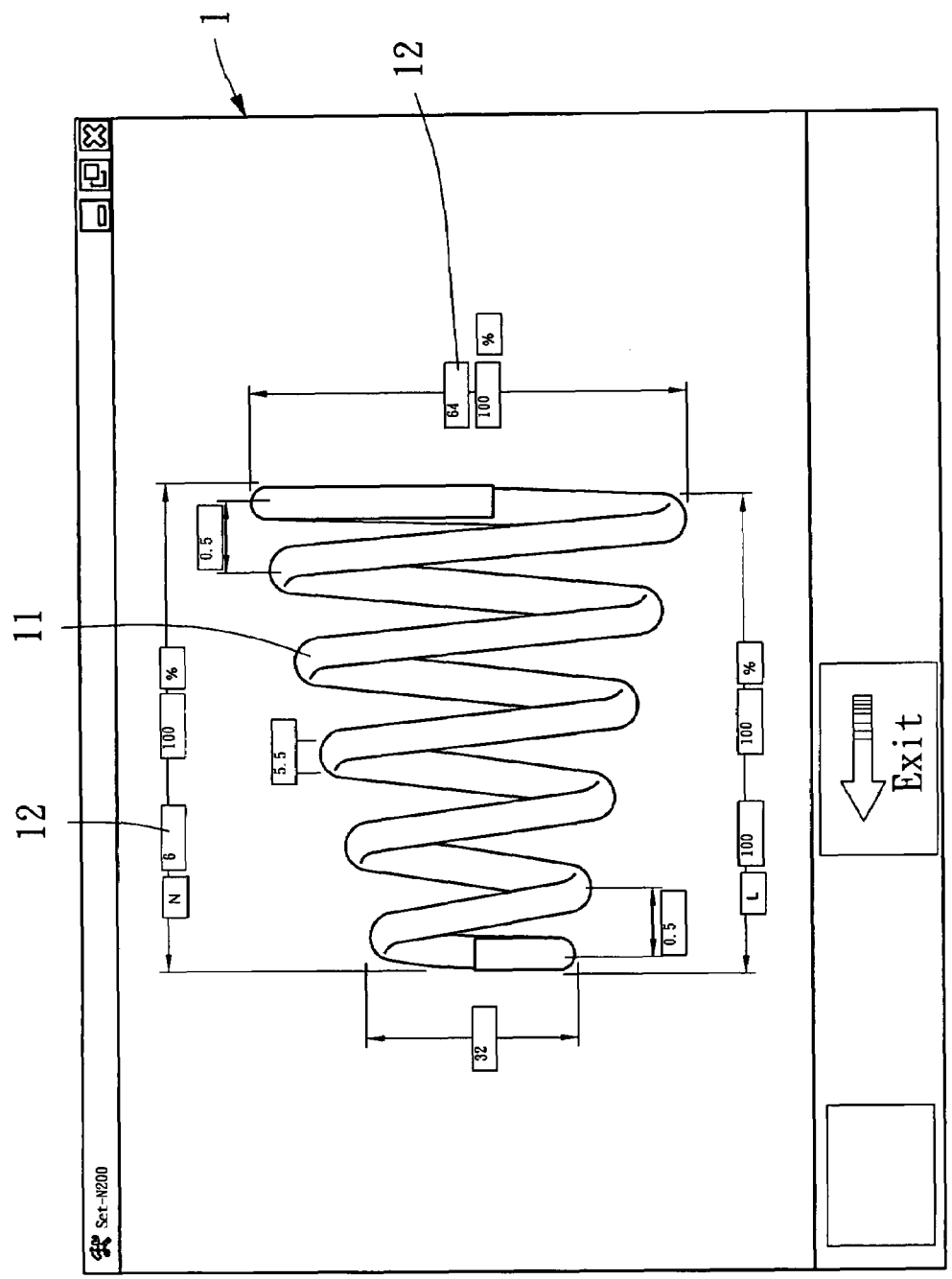
FIG. 5 is a schematic drawing of Spring Parameter Setting Interface of the spring-forming control system according to the present invention.

When compared with the prior art designs, the current invention has the following unique features:

The display monitor (a) of the host computer provides a switchable diagram or graphic interfaces including Spring Parameter Setting Interface (1), Program Modification Interface (2), and Dragline-Method Program Modification Interface (3) (i.e., the picture frame displayed on the display monitor can be switched from the picture frame on FIG. 3 to the picture frame on FIG. 5, 7, 8, 9, or 10), wherein:

Spring Parameter Setting Interface (1) is for setting spring processing parameters, providing a Spring plane Figure (11) and a plurality of Spring Parameter Input Boxes (12) (see FIG. 5);

Program Modification Interface (2) lists spring parameters including OD (21), Pitch (22), Feed (23), Upper Cutter (24), Lower Cutter (25), and Number of Coils (Turns) (26) (see FIG. 7);

Dragline-Method Program Modification Interface (3) provides multiple spring parameter selection interfaces including selection interface for the spring parameters of OD (21) (Line X), selection interface for the spring parameters of Pitch (22) (Line Y), and selection interface for the spring parameters of Feed (23) (Line Z) (see FIGS. 8, 9, and 10), each spring parameter selection interface providing a shift-adjustment frame (31) for adjustment of spring parameters by dragline, i.e. with "drag-and-drop" methods, and a spring parameter list (32) such that when making an adjustment by dragline or when modifying the shift-adjustment frame (31) (when dragging the mouse after pressed the scroll-control wheel of the mouse at the point to be modified), the spring parameter list (32) is accordingly changed; on the contrary, when correcting the spring parameter list (32) directly, the content of the shift-adjustment frame (31) is accordingly changed.

The display monitor (a) of the host computer further provides Spring Preview Graphic Interface (4) (i.e., the picture frame displayed on the display monitor (a) of the host computer can be switched to the picture frame shown on FIG. 6). Spring Preview Graphic Interface (4) also shows the corresponding spring parameter list (32). When correct the parameters listed in the spring parameter list (32), the figure of the spring is accordingly changed.

In general, the invention uses diagram interfaces and graphic interfaces to facilitate operation of the spring forming machine so that the operator can set or correct the parameters easily without language barriers. A beginner can operate the spring forming machine easily without difficulty. The dragline method allows direct correction of the parameters. Spring preview interface allows the operator to preview the pattern of the spring to be made to reduce the error rate and to improve the accuracy and product yield rate.

Although a particular embodiment of the invention has been described in detail for purposes of illustration, various modifications and enhancements may be made without departing from the spirit and scope of the invention.

What the invention claimed is:

1. A spring-forming control method used with a spring-forming control system in a spring forming machine for making springs, said spring-forming control system providing a spring parameter setting interface, a program modification interface, and a dragline method program modification interface switchable on a graphical user interface (GUI) display monitor of a host computer controlling the operation of said spring forming machine with automated adjustment of at least four parameters selected from the group consisting of Outside Diameter (OD), Pitch, Feed, Upper Cutter, Lower Cutter, and Number of Coils, the spring-forming control method comprising the steps of:

(1) setting spring processing parameters using said spring parameter setting interface;

(2) trying to make a spring subject to a spring parameter auto-generation software built in said spring-forming control system; and (3) starting the production if the trial meets the requirements otherwise entering one of said spring parameter setting interface and said program modification interface and said dragline-method program modification interface using drag-and-drop methods to modify the spring processing parameters or the program if the trial does not meet the requirements, and then making a secondary spring trial production, and, if necessary, repeating the procedure again and again till the shaped spring meets the requirements.

2. The spring-forming control method as claimed in claim 1, wherein said spring-forming control method further includes viewing a spring preview graphic interface providing a preview of the pattern of the spring to be made before the production begins.

3. The spring-forming control method as claimed in claim 2, wherein said spring parameter setting interface provides a spring plane figure and a spring parameter input boxes for the user to input data subject to requirements.

4. The spring-forming control method as claimed in claim 1, wherein said program modification interface on the display monitor of said host computer displays spring parameters including OD, Pitch, Feed, Upper Cutter, Lower Cutter, and Number of Coils (Turns).

5. The spring-forming control method as claimed in claim 4, wherein said dragline-method program modification interface provides an OD (outer diameter) axis selection interface, a pitch axis selection interface, and a feed axis selection interface, and the selection interfaces each providing a shift-adjustment frame for adjustment using dragline and a corresponding spring parameter list; when making an adjustment using dragline or when modifying said shift-adjustment frame, said spring parameter list is accordingly changed; when correcting said spring parameter list, the content of said shift-adjustment frame is accordingly changed.

6. The spring-forming control method as claimed in claim 2, wherein said spring preview graphic interface provides a corresponding spring parameter list, and the figure of the spring is accordingly changed when correcting the parameters listed in the corresponding spring parameter list.

7. A spring-forming control system used in a spring forming machine for making springs, comprising a host computer, further comprising a spring parameter auto-generating software, controlling the operation of said spring forming machine to make springs subject to said spring parameter auto-generating software and having automated adjustment of at least four parameters selected from the group consisting of Outside Diameter (OD), Pitch, Feed, Upper Cutter, Lower Cutter, and Number of Coils;

a graphical user interface (GUI) display monitor, electrically connected to said host computer for data display, providing a selectively switchable display of any one GUI screen selected from the group consisting of a main menu, a Spring Parameter Setting Interface, a Program Modification Interface, a Dragline-Method Program Modification Interface, and a Spring Preview Graphic Interface; and a GUI instruction input interface electrically connected to said host computer for data input;

wherein:

said spring parameter setting interface provides a spring plain figure and a spring parameter input column and is adapted for setting spring processing parameters, said program modification interface listing spring parameters, said dragline-method program modification interface providing a plurality of spring parameter selection interfaces, said spring parameter selection interfaces each providing a shift-adjustment frame for adjustment of spring parameters by dragline methods and a corresponding spring parameter list.

8. The spring-forming control system as claimed in claim 7, wherein said host computer further provides on said display monitor a spring preview graphic interface having a spring plane figure and at least one spring parameter input box adapted for setting spring processing parameters.

9. The spring-forming control system as claimed in claim 8, wherein said program modification interface includes spring parameters OD, Pitch, Feed, Upper Cutter, Lower Cutter, and Number of Coils (Turns).

10. The spring-forming control system as claimed in claim 9, wherein said program modification interface includes a dragline-method program modification interface which provides an OD (outer diameter) selection interface, a pitch selection interface, and a feed selection interface, and these selection interfaces each provide a shift-adjustment frame for adjustment by dragline and a corresponding spring parameter list; when making an adjustment by dragline or when modifying said shift-adjustment frame, said spring parameter list is accordingly changed; when correcting said spring parameter list, the content of said shift-adjustment frame is accordingly changed.

11. The spring-forming control system as claimed in claim 8, wherein said spring preview graphic interface provides a corresponding spring parameter list, and the figure of the spring is accordingly changed when correcting the parameters listed in the corresponding spring parameter list.

* * * * *